(12) United States Patent
Gumpoltsberger et al.

(10) Patent No.: US 9,182,013 B2
(45) Date of Patent: Nov. 10, 2015

(54) POWER-SHIFTABLE TRANSMISSION (75) Inventors: Gerhard Gumpoltsberger, Friedrichshafen (DE); Bernhard Sich, Friedrichshafen (DE); Matthias Reisch, Ravensburg (DE); Manuel Goetz, Ravensburg (DE); Mark Mohr, Tettnang (DE); Ralf Dreibholz, Meckenbeuren (DE); Peter Ziemer, Tettnang (DE); Gert Bauknecht, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 16 days.

(21) Appl. No.: 13/878,433

(22) PCT Filed: Sep. 19, 2011

(86) PCT No.: PCT/EP2011/066188
§ 371 (c)(1),
(2), (4) Date: Apr. 9, 2013

(87) PCT Pub. No.: WO2012/052237
PCT Pub. Date: Apr. 26, 2012

(65) Prior Publication Data
US 2013/0196814 A1 Aug. 1, 2013

(30) Foreign Application Priority Data
Oct. 20, 2010 (DE) .................. 10 2010 042 656

(51) Int. Cl.
*F16H 3/78* (2006.01)
*F16H 3/44* (2006.01)
(Continued)

(52) U.S. Cl.
CPC .. *F16H 3/44* (2013.01); *F16H 3/66* (2013.01); *F16H 3/663* (2013.01); *F16H 3/666* (2013.01);
(Continued)

(58) Field of Classification Search
CPC ................ F16H 3/78; F16H 2200/006; F16H 2200/2094; F16H 3/0073; F16H 3/0078; F16H 2200/0065
USPC .......... 475/303, 284, 338; 477/127, 128, 130, 477/143
See application file for complete search history.

(56) References Cited

U.S. PATENT DOCUMENTS 5,106,352 A 4/1992 Lepelletier
5,915,512 A 6/1999 Adamis et al.
(Continued)

FOREIGN PATENT DOCUMENTS

DE 197 11 820 A1 9/1998
DE 102 10 348 A1 10/2003
(Continued)

OTHER PUBLICATIONS

German Search Report Corresponding to 10 2010 042 656.3.
(Continued)

*Primary Examiner* — Roger Pang
(74) *Attorney, Agent, or Firm* — Davis & Bujold, P.L.L.C.; Michael J. Bujold (57) ABSTRACT

A power-shiftable transmission, in particular an automatic transmission for a vehicle, which comprises a plurality of frictional shifting elements and at least one interlocking shifting element (A, B, C, D, E) and a plurality of gearwheels which can be engaged in a power flow by the shifting elements (A, B, C, D, E). In order to engage a gear step, at least two associated shifting elements (A, B, C, D, E) are engaged and at least one interlocking shifting element (B), as a shifting element (B) to be engaged, is associated with a gear step to be engaged with a supporting gear.

10 Claims, 6 Drawing Sheets

(51) Int. Cl.
 *F16H 3/66* (2006.01)
 *F16H 61/04* (2006.01)

(52) U.S. Cl.
 CPC .... *F16H 61/0403* (2013.01); *F16H 2061/0474* (2013.01); *F16H 2200/0052* (2013.01); *F16H 2200/0069* (2013.01); *F16H 2200/201* (2013.01); *F16H 2200/2007* (2013.01); *F16H 2200/2012* (2013.01); *F16H 2200/2023* (2013.01); *F16H 2200/2043* (2013.01); *F16H 2200/2048* (2013.01); *F16H 2200/2051* (2013.01); *F16H 2200/2064* (2013.01); *F16H 2200/2094* (2013.01); *F16H 2200/2097* (2013.01)

(56) References Cited

U.S. PATENT DOCUMENTS

| | | | |
|---|---|---|---|
| 6,962,549 B2 | 11/2005 | Dreibholz et al. | |
| 7,125,360 B2 | 10/2006 | Ziemer | |
| 7,651,432 B2 | 1/2010 | Bauknecht et al. | |
| 7,682,281 B2 | 3/2010 | Ziemer | |
| 7,780,570 B2 | 8/2010 | Iwatsuki et al. | |
| 8,029,405 B2 | 10/2011 | Kim | |
| 8,398,522 B2 | 3/2013 | Bauknecht et al. | |
| 8,500,601 B2 * | 8/2013 | Arnold et al. | 477/154 |
| 8,808,134 B2 * | 8/2014 | Saitoh et al. | 475/276 |
| 2009/0325763 A1 | 12/2009 | Dittrich et al. | |
| 2010/0044140 A1 | 2/2010 | Shultz et al. | |
| 2011/0263382 A1 * | 10/2011 | Arnold et al. | 477/121 |
| 2011/0301819 A1 | 12/2011 | Arnold et al. | |

FOREIGN PATENT DOCUMENTS

| | | |
|---|---|---|
| DE | 102 44 023 A1 | 4/2004 |
| DE | 103 18 565 A1 | 11/2004 |
| DE | 10 2004 014 081 A1 | 10/2005 |
| DE | 10 2004 038 279 A1 | 2/2006 |
| DE | 10 2007 059 472 A1 | 6/2008 |
| DE | 10 2008 000 429 A1 | 9/2009 |
| DE | 10 2008 002 750 A1 | 12/2009 |
| DE | 10 2009 023 046 A1 | 12/2009 |
| DE | 10 2009 000 253 A1 | 7/2010 |
| DE | 10 2009 002 205 A1 | 10/2010 |
| EP | 0 434 525 A1 | 6/1991 |

OTHER PUBLICATIONS

International Search Report Corresponding to PCT/EP2011/066188.
Written Opinion Corresponding to PCT/EP2011/066188.

* cited by examiner

Fig. 2 SUPPORTING GEAR

Fig. 3 SUPPORTING GEAR

| | A | B | C | D | E |
|---|---|---|---|---|---|
| R. GEAR | | ○ | | ○ | |
| 1. GEAR | ○ | | | ○ | |
| 2. GEAR | ○ | | ● | | |
| 3. GEAR | ○ | ○ | | | |
| 4. GEAR | ○ | | | | ● |
| 5. GEAR | | ○ | | | ● |
| 6. GEAR | | | ● | | ● |

| | A | B | C | D | E |
|---|---|---|---|---|---|
| R. GEAR | | | ○ | | ● |
| 1. GEAR | ● | | | | ● |
| 2. GEAR | ● | | | ● | |
| 3. GEAR | ● | | ○ | | |
| 4. GEAR | ● | ● | | | |
| 5. GEAR | | ● | ○ | | |
| 6. GEAR | | ● | | ● | |

| | A | B | C | D | E | F |
|---|---|---|---|---|---|---|
| R. GEAR | | ○ | | ● | | |
| 1. GEAR | ● | | | ● | | |
| 2. GEAR | ● | | ● | | | |
| 3. GEAR | ● | ○ | | | | |
| 4. GEAR | ● | | | | | ○ |
| 5. GEAR | ● | | | | ● | |
| 6. GEAR | | | | | ● | ○ |
| 7. GEAR | | ○ | | | ● | |
| 8. GEAR | | | ● | | ● | |

| | A | B | C | D | E | F |
|---|---|---|---|---|---|---|
| R. GEAR | | ○ | | ○ | | |
| 1. GEAR | ○ | | | ○ | | |
| 2. GEAR | ○ | | ● | | | |
| 3. GEAR | ○ | ○ | | | | |
| 4. GEAR | ○ | | | | | ○ |
| 5. GEAR | ○ | | | | ● | |
| 6. GEAR | | | | | ● | ○ |
| 7. GEAR | | ○ | | | ● | |
| 8. GEAR | | | ● | | ● | |

| GEAR | CLAW CLUTCH | | | CLAW BRAKE | | FRICTIONAL SHIFT ELEMENT | | GEAR RATIO |
|---|---|---|---|---|---|---|---|---|
| | A | B | F | G | D | C | E | |
| R3 | | | ○ | | ○ | | | −1.60 |
| R2 | | ○ | | | ○ | | | −2.74 |
| R1 | | | | ○ | ○ | | | −5.92 |
| 1 | ○ | | | | ○ | | | 4.97 |
| 2(SG) | ○ | | | | | ● | | 2.97 |
| 3 | ○ | | | ○ | | | | 2.22 |
| 4 | ○ | ○ | | | | | | 1.71 |
| 5 | ○ | | ○ | | | | | 1.32 |
| 6(SG) | ○ | | | | | | ● | 1.17 |
| 7 | | | ○ | | | | ● | 1.00 |
| 8 | | ○ | | | | | ● | 0.79 |
| 9 | | | | ○ | | | ● | 0.69 |
| 10(SG) | | | | | | ● | ● | 0.62 |

Fig. 10A

POWER-SHIFTABLE TRANSMISSION

This application is a National Stage completion of PCT/EP2011/066188 filed Sep. 19, 2011, which claims priority from German patent application serial no. 10 2010 042 656.3 filed Oct. 20, 2010.

FIELD OF THE INVENTION

The present invention concerns a power-shiftable transmission, in particular an automatic transmission for a vehicle.

BACKGROUND OF THE INVENTION

For example from the document EP 0 434 525 A1 an automatic multi-gear transmission for vehicles is known, which comprises a number of planetary gearsets which are shifted by means of frictional elements such as clutches and brakes and are usually connected to a starting element such as a hydraulic torque converter or a fluid coupling with a protective action and which is optionally provided with a bridging clutch. However, such automatic transmissions have the disadvantage that all their shifting elements are in the form of frictional disk clutches or disk brakes, which take up a lot of space and are cost-intensive.

Furthermore, from the document DE 102 44 023 A1 a transmission is known, which comprises a plurality of shifting elements and a number of shiftable gearwheels which, by means of the shifting elements, can be engaged in a power flow, wherein to obtain a gear in each case at least one of the shifting elements is closed. The shifting elements to be engaged for upshifts are in the form of frictional shifting elements and the shifting elements which, in each case, are those only one of which has to be disengaged for upshifts, are in the form of shape-interlocking shifting elements. Owing to the numerous frictional shifting elements used, drag losses in the known transmission and also its costs and space occupation are high.

SUMMARY OF THE INVENTION

The purpose of the present invention is to propose a transmission of the type described at the start, in which drag losses and also the space occupied by the transmission are minimized.

Accordingly, a power-shiftable transmission of planetary design is proposed, in particular an automatic transmission for a vehicle, which comprises a plurality of frictional shifting elements and at least one interlocking shifting element as well as a number of shiftable gearwheels which, by means of the shifting elements, can be engaged in a power flow, wherein to obtain or engage a gear ratio or gear step at least one of the shifting elements is closed. According to the invention, at least one interlocking shifting element is provided as a shifting element to be engaged when obtaining a gear ratio or gear step, such that the gear step is engaged with the help of a supporting gear.

Thus a transmission, in particular a planetary transmission is proposed, which comprises as few power-shiftable, frictional shifting elements as possible, regardless of whether besides the at least one planetary gearset one or more spur gear stages are also provided. Since the power density of interlocking shifting elements is much greater than that of frictional shifting elements, in contrast to frictional shifting elements when interlocking shifting elements are in the open condition they are virtually free from drag losses. In this way not only are the drag losses that occur with frictional shifting elements reduced, but also the production costs and structural space occupation can be reduced substantially since as many interlocking, unsynchronized shifting elements as possible, such as shifting claws or the like, are used.

To be able to use an interlocking shifting element as a shifting element to be shifted to "on" during a desired gearshift or change of gear ratio, it is necessary, for example in upshifts, for there to be a gear step above the target gear to be engaged, which can be used as a supporting gear. This is necessary because when engaging the interlocking shifting element, the existing rotational speed difference has to be eliminated.

In an advantageous embodiment of the invention it can also be provided that in addition, at least one interlocking shifting element is associated with a gear step as a shifting element to be shifted "off". In this way the number of frictional shifting elements required can be reduced still more.

In the transmission according to the invention it is proposed as a possible shift sequence, for example for an upshift to a gear ratio or gear step in which one of the shifting elements to be shifted to "on" is an interlocking shifting element, that as the supporting gear an alternative gear is used, which has a lower gear ratio, with which the rotational speed difference is reduced to zero so that the interlocking shifting element can then be engaged.

When selecting a suitable supporting gear it should be borne in mind that the change from the initial or current gear to the supporting gear concerned should entail changing only one shifting element or opening one shifting element and closing or engaging one other power-shifting element or supporting shifting element. Moreover, to change from the supporting gear to the desired target gear only the supporting shifting element should be opened and the interlocking or claw shifting element, which is the new shifting element to be shifted to "on", should be actuated. Advantageously, all the other shifting elements that are closed in the gears involved remain closed during the shifting process, or are at most brought to a slipping condition for a short time.

With the idea on which the invention is based, that of using interlocking shifting elements also for shifting elements being shifted to "on" and using supporting gears in the shifting processes concerned, in order to achieve the necessary synchronization an automatic transmission can advantageously be produced which, besides the claw shifting elements provided as its interlocking shifting elements, is designed with only two frictional shifting elements. In this way, with the same number of gears drag torques can be very greatly reduced without adverse effect on the power-shifting ability. Preferably for example, the frictional shifting elements used can also be ones with low drag torque, which are subjected to less thermal stress.

For example, if the transmission according to the invention has only two frictional shifting elements, these can be engaged together in the highest gear and, in lower gears, individually with at least one interlocking or claw shifting element. Gear steps below the gears with engaged frictional shifting elements can be engaged by means of supporting shifting elements without loss of traction force during the shift. The smaller the gear interval between the current gear and the supporting gear, the less the traction force is limited during the shift. Expediently, a selected supporting gear should only be one gear step, or at most three gear steps higher than the target gear to be engaged.

As interlocking shifting elements, preferably unsynchronized claw shifting elements can be used, for example claw clutches, claw brakes or the like, with claws of any shape such as ones with a straight profile or an inclined profile having a deflecting function. The shifting elements can be actuated for example hydraulically, by electric motor, electromagnetically, or the like.

BRIEF DESCRIPTION OF THE DRAWINGS

The present invention will now be explained in more detail with reference to the drawings, in which examples of various embodiment variants are shown. The drawings show.

DETAILED DESCRIPTION OF THE PREFERRED EMBODIMENTS

The figures show various embodiment variants of a power-shiftable transmission of planetary design proposed according to the invention, having a plurality of frictional and interlocking shifting elements A, B, C, D, E, F and G and a plurality of gearwheels that can be engaged in a power flow by means of the shifting elements, wherein to engage a gear step at least two associated shifting elements A, B, C, D, E, F and G are closed.

According to the invention, in the transmission the use of interlocking shifting elements is envisaged when these also have to be shifted to "on" when a higher gear step is available, which can be used as a supporting gear. In this way both the drag losses of the transmission and also its costs and space occupation can be optimized, since for example claw shifting elements can then be used.

Figure 1:
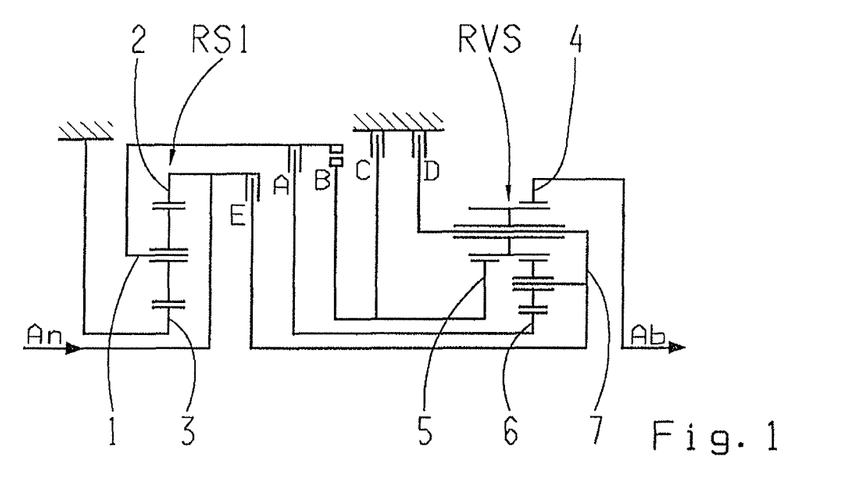
FIG. 1: A schematic view of a first embodiment variant of a power-shiftable, six-gear planetary transmission for a motor vehicle.

FIG. 1 shows a first embodiment variant of the transmission according to the invention in the form of a planetary transmission with a first planetary gearset RS1 and a second gearset in the form of a dual planetary gearset of Ravigneaux design RVS, and with five shifting elements A, B, C, D and E.

In the gear arrangement according to FIG. 1, a planetary carrier 1 of the first planetary gearset RS1 is connected to the first shifting element A which is a friction clutch and to the second shifting element B which is a claw clutch, and a ring gear 2 of the first planetary gearset RS1 is connected to a drive input shaft An and to the fifth shifting element E, which is a friction clutch. A sun gear 3 of the first planetary gearset RS1 is connected to the housing. In addition, a ring gear 4 of the Ravigneaux gearset RVS is connected to a drive output shaft Ab and a first sun gear 5 of the Ravigneaux gearset RVS is connected to the second shifting element B, which is a claw clutch, and to the third shifting element C, which is a friction brake. A second sun gear 6 of the Ravigneaux gearset RVS is connected to the shifting element A, which is a friction clutch, and a planetary carrier 7 of the Ravigneaux gearset RVS is connected, on the one hand, to the fifth shifting element E, which is a friction clutch, and, on the other hand, to a fourth shifting element D, which is a friction brake.

Figure 1A:
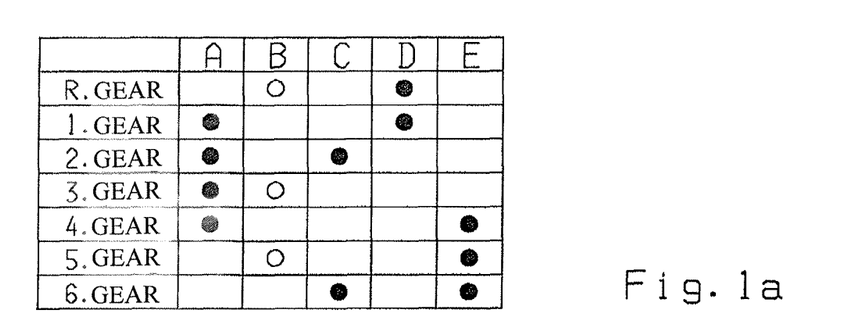
FIG. 1A: A possible shifting scheme of the gear arrangement shown in FIG. 1.

The shifting scheme in FIG. 1A shows that the first gear can be engaged by closing the first shifting element A and the fourth shifting element D, the second gear by closing the first shifting element A and the third shifting element C, the third gear by closing the first shifting element A and the second shifting element B, the fourth gear by closing the first shifting element A and the fifth shifting element E, the fifth gear by closing the second shifting element B and the fifth shifting element E, the sixth gear by closing the third shifting element C and the fifth shifting element E, and a reversing gear can be engaged by closing the second shifting element B and the fourth shifting element D. Thus, the second shifting element B is associated, as the claw clutch to be engaged, with the third and fifth gear steps and with the reversing gear step.

Figure 2:
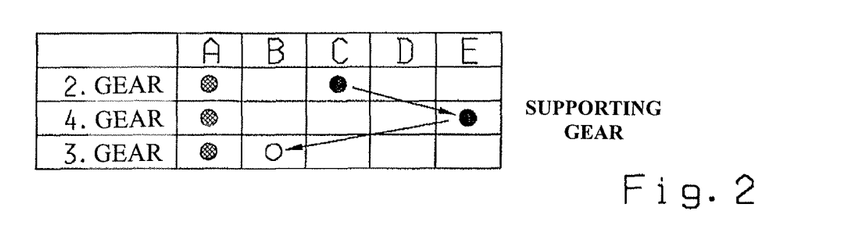
FIG. 2: A shifting scheme with an example of a shift from the second to the third gear step by way of the fourth gear as the supporting gear.

FIG. 2 shows as an example an upshift from the second to the third gear step, using the fourth gear step as a supporting gear. For this shift, first of all the shifting element C to be disengaged is opened. Since the second shifting element B is in the form of a claw clutch to be engaged but cannot be so while the existing rotational speed difference persists, a traction upshift is achieved in that as a first step a load transfer from the third shifting element C to the fifth shifting element E in the form of a friction clutch takes place, whereby the gear ratio of the fourth gear step is set. With the shifting element E slipping, the engine is now adjusted to the new target rotational speed until the speed difference at the second shifting element B in the form of a claw clutch is reduced to zero. The claw clutch can then be engaged and the fifth shifting element E opened again, so that the third gear step is engaged.

Figure 3:
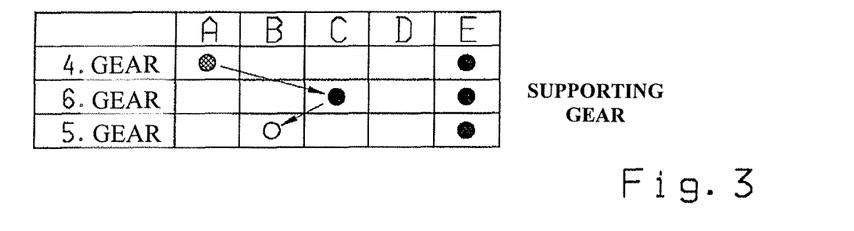
FIG. 3: A shifting scheme with an example of a shift from the fourth to the fifth gear step by way of the sixth gear step as the supporting gear.

FIG. 3 shows as an example an upshift from the fourth to the fifth gear step, using the sixth gear step as the supporting gear. In principle the shifting sequence is identical to that described above. The shifting element to be disengaged is the first shifting element A, the third shifting element is the shift-supporting element, and the shifting element to be engaged is again the second shifting element B.

Figure 4:
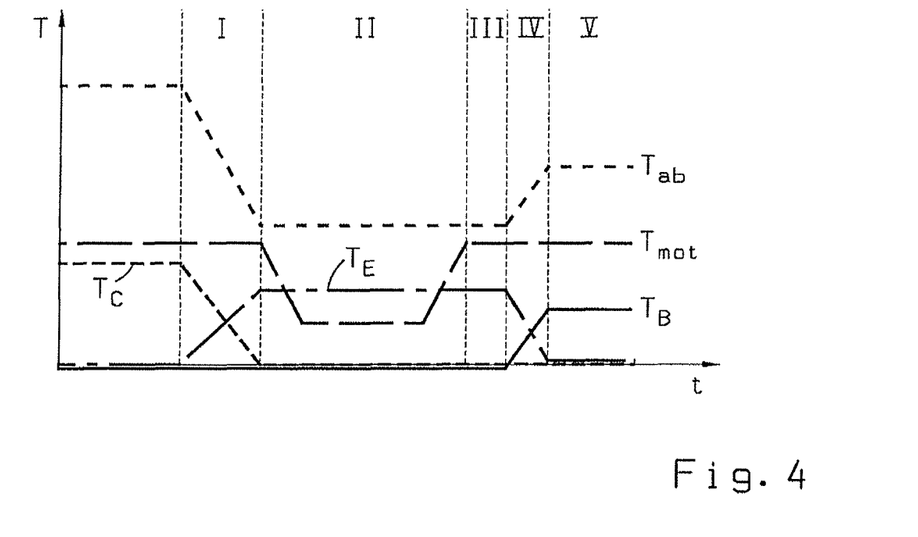
FIG. 4: A diagram showing rotational speed variations during the shift described in FIG. 2.
Figure 5:
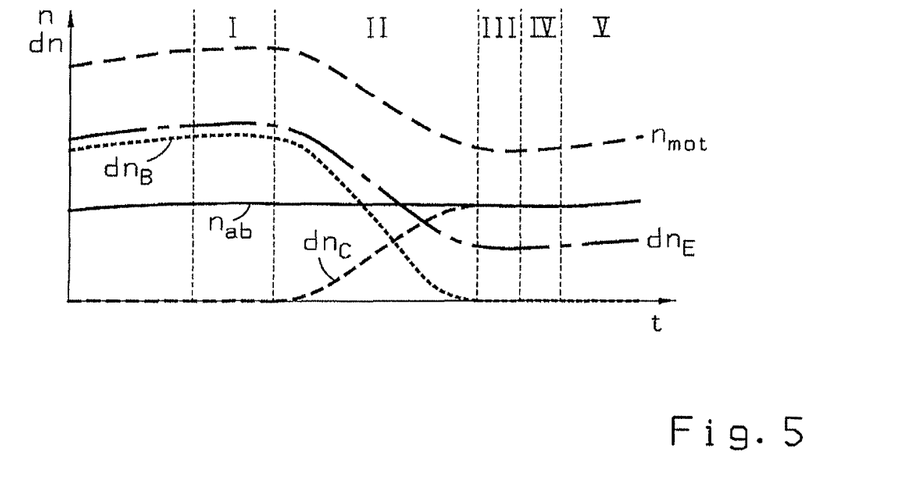
FIG. 5: A diagram showing absolute speed and speed-difference variations during the shift described in FIG. 2.

To explain more precisely the shifting sequence for the traction upshift 2-to-3 shown in FIG. 2 as an example for other possible shifts, FIGS. 4 and 5 show, on the one hand, the variations of the torques $T_B$, $T_C$, $T_E$ at the shifting elements B, C, E involved and that of the engine torque $T_{mot}$ and the drive output torque $T_{ab}$, and, on the other hand, the absolute rotational speeds of the drive input $n_{mot}$ and output $n_{ab}$, and the rotational speed differences $dn_B$, $dn_C$, $dn_E$ at the shifting elements B, C, E involved, in each case as a function of time t.

In a first phase I, the third shifting element C is opened. In a second phase II, the internal combustion engine is synchronized by reducing the load acting upon the engine, as shown, or by increasing the slipping torque at the fifth shifting element E in the form of a friction clutch. When speed equalization has taken place at the second shifting element B in the form of a claw clutch, a third phase III begins, in which the claw clutch is closed. When the claw clutch has closed a fourth phase IV begins, in which the slipping torque at the fifth shifting element E is reduced and the load is taken over by the second shifting element B. In a fifth phase V the target gear is engaged.

A thrust upshift to a target gear with which an interlocking shifting element is associated as the element to be engaged, can for example be carried out as a conventional thrust upshift, since first of all the old shifting element, i.e. that associated with the current gear, is opened and brought to a slipping condition. Owing to the thrust torque of the internal combustion engine, the engine slows down to the target speed. When the target speed has been reached, the slipping torque is increased again and the interlocking shifting element can be closed and the shifting element of the previous or current gear step fully opened, so that the shift is completed.

A traction downshift from a current gear with which an interlocking shifting element is associated takes place either with traction force interruption, or with the help of a suitable higher supporting gear. In that case, with the shift 3-to-2 taken as an example, the fourth gear step can again be used as the supporting gear, in that first a load transfer to the fourth gear step takes place. After this, synchronization with the target gear can be carried out by means of the fifth, frictional shifting element E operating with slip.

For a thrust downshift, first of all the new, or target-gear power-shifting element is closed and can thereby bring a slipping torque to bear. Consequently the interlocking shifting element is unloaded and can be opened. Thereafter, with the help of the new shifting element and if necessary with additional support from the engine, the shift can be completed.

Figure 6:
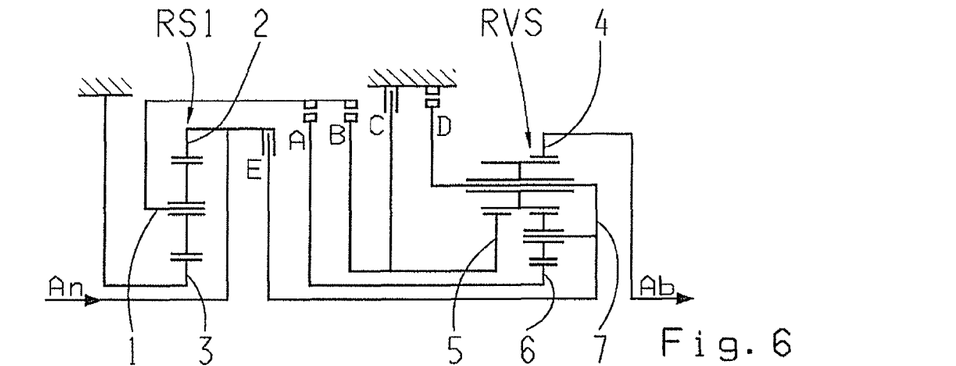
FIG. 6: A schematic view of a second embodiment variant of a power-shiftable, six-gear planetary transmission for a motor vehicle.
Figure 6A:
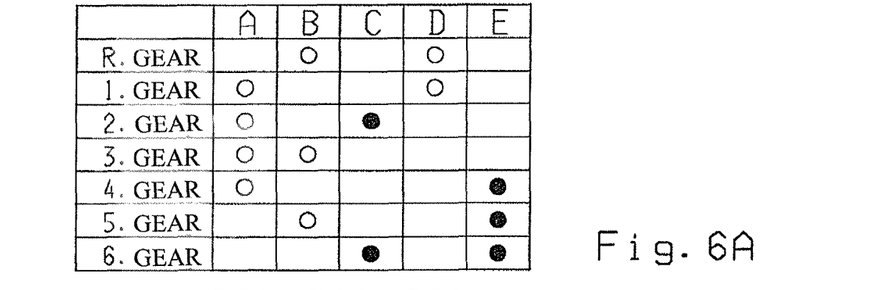
FIG. 6A: A possible shifting scheme for the planetary gear arrangement shown in FIG. 6.

FIG. 6 shows a second embodiment variant of the invention which deviates from the planetary gear arrangement shown in FIG. 1. The difference from the first embodiment variant is that in the gear arrangement of the second embodiment variant two further interlocking shifting elements are provided instead of frictional shifting elements. Besides the second shifting element B, the first shifting element A is provided in the form of a claw clutch and the fourth shifting element D in the form of a claw brake.

The shifting scheme of FIG. 1A also applies for the gear arrangement in FIG. 6. However, besides the second shifting element B associated with the third and fifth gear steps and the reversing gear as the claw clutch to be engaged, in addition the first shifting element A associated with the first to fourth gear steps is the claw clutch to be disengaged, and the fourth shifting element D associated with the reversing gear and the first gear step is a claw brake to be disengaged, so that only the third and fifth shifting elements C and E respectively are in the form of frictional, power-shiftable shifting elements. Moreover, in the highest gear step no power-shifting element is open so no drag losses occur in that gear.

Figure 7:
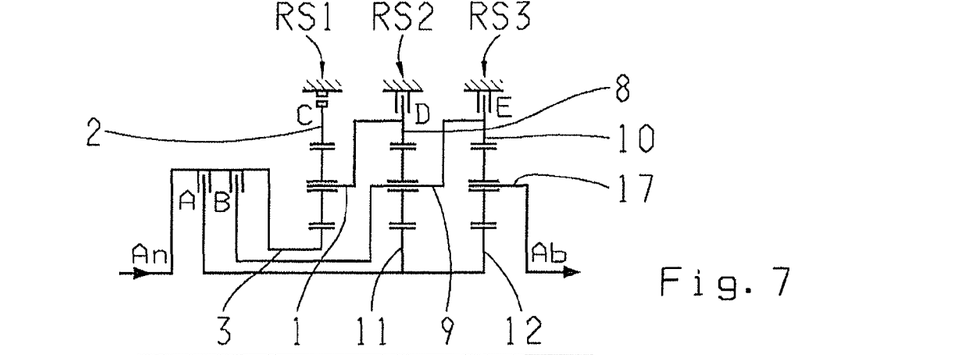
FIG. 7: A schematic view of a third embodiment variant of a power-shiftable, six-gear planetary transmission for a motor vehicle.

FIG. 7 shows a third embodiment variant of the invention, which is a power-shiftable, six-gear planetary transmission with three planetary gearsets RS1, RS2, RS3 and five shifting elements A, B, C, D and E. In this gear arrangement a sun gear 3 of the first planetary gearset RS1 is connected to the drive input shaft An, to the first shifting element A which is a friction clutch, and to the second shifting element B which is also a friction clutch. A ring gear 2 of the first planetary gearset RS1 is connected to the third shifting element C which is a claw brake, and a planetary carrier 1 of the first planetary gearset RS1 is connected to the fourth shifting element D which is a friction brake and to a ring gear 8 of the second planetary gearset RS2. Furthermore, a planetary carrier 9 of the second planetary gearset RS2 is connected, on the one hand, to the second shifting element B which is a friction clutch and, on the other hand, to a fifth shifting element E which is a friction brake, and also to a ring gear 10 of the third planetary gearset RS3. A sun gear 11 of the second planetary gearset RS2 is connected to the first shifting element A which is a friction clutch and to a sun gear 12 of the third planetary gearset RS3, and a planetary carrier 17 of the third planetary gearset RS3 is connected to the drive output shaft Ab.

Figure 7A:
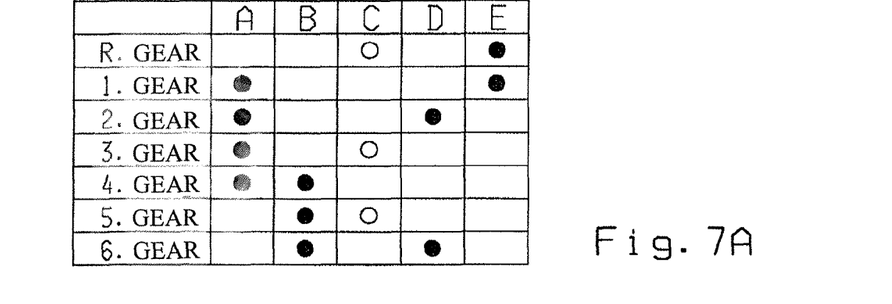
FIG. 7A: A possible shifting scheme for the planetary gear arrangement shown in FIG. 7.

From the shifting scheme shown in FIG. 7A it can be seen that the first gear step is engaged by closing the first shifting element A and the fifth shifting element E, the second gear step by closing the first shifting element A and the fourth shifting element D, the third gear step by closing the first shifting element A and the third shifting element C, the fourth gear step by closing the first shifting element A and the second shifting element B, the fifth gear step by closing the second shifting element B and the third shifting element C, the sixth gear step by closing the second shifting element B and the fourth shifting element D, and the reversing gear ratio by closing the third shifting element C and the fifth shifting element E.

Advantageously, in the gear arrangement according to this third embodiment variant the third shifting element C is in the form of a claw brake to be engaged and is associated with the third and fifth gear steps and with the reversing gear. Thus, shifting processes into the third and fifth gear steps, with which the claw brake is associated, can be carried out analogously to the previously described shifting method with the help of a supporting gear, such that for example to shift from the second to the third gear step, the second shifting element B of the fourth gear step can be used as the supporting element. When shifting from the fourth to the fifth gear step, the fourth shifting element D of the sixth gear step can be used as the supporting element. For corresponding downshifts, as already described, for example shifting elements of gear steps lower than the desired target gear can be used.

Figure 8:
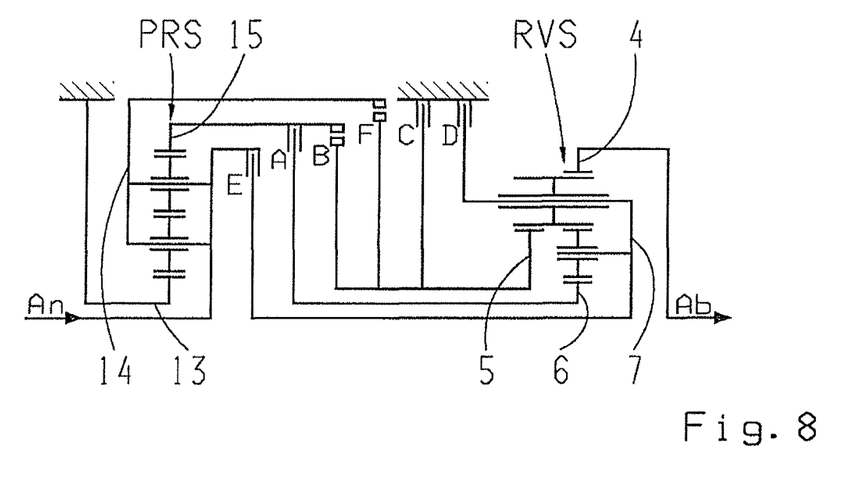
FIG. 8: A schematic view of a fourth embodiment variant of a power-shiftable, eight-gear planetary transmission for a motor vehicle.

FIG. 8 shows a fourth embodiment variant of the invention, which is a power-shiftable, eight-gear planetary transmission with a plus planetary gearset PRS and a Ravigneaux gearset RVS and with six shifting elements A, B, C, D, E and F of which, as interlocking shifting elements, the second shifting element B is in the form of a claw clutch and the sixth shifting element F is in the form of a claw brake.

In this gear arrangement a sun gear 13 of the plus planetary gearset PRS is fixed onto the housing and a planetary carrier 14 of the plus planetary gearset PRS is connected, on the one hand, to the sixth shifting element F which is a claw clutch and, on the other hand, to the drive input shaft An and to the fifth shifting element E which is a friction clutch. Furthermore a ring gear 15 of the plus planetary gearset PRS is connected to the first shifting element A which is a friction clutch and to the second shifting element B which is a claw clutch. A ring gear 4 of the Ravigneaux gearset RVS is connected to the drive output shaft Ab, and a first sun gear 5 of the Ravigneaux gearset RVS is connected to the second shifting element B which is a claw clutch, to the third shifting element C which is a friction brake and to the sixth shifting element F which is a claw clutch, whereas a second sun gear 6 of the Ravigneaux gearset RVS is connected to the first shifting element A which is a friction clutch. A planetary carrier 7 of the Ravigneaux gearset RVS is connected, on the one hand, to the fifth shifting element E which is a friction clutch, and, on the other hand, to the fourth shifting element D which is a friction brake.

Figure 8A:
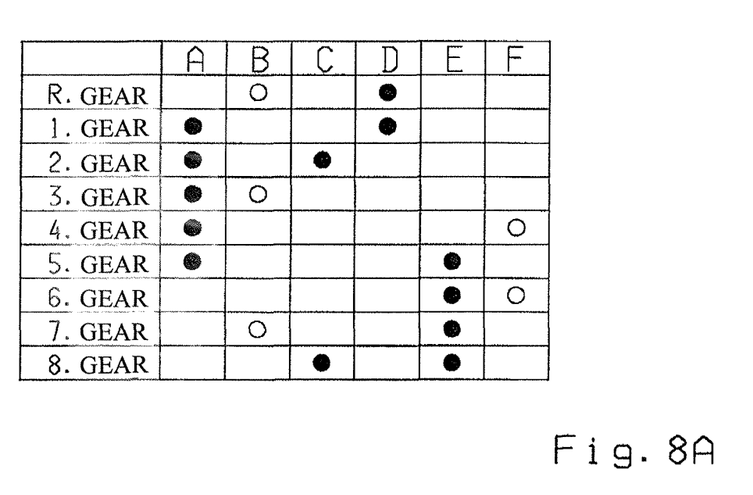
FIG. 8A: A possible shifting scheme for the planetary gear arrangement shown in FIG. 8.

The shifting scheme of FIG. 8A shows that the first gear step can be engaged by closing the first shifting element A and the fourth shifting element D, the second gear step by closing the first shifting element A and the third shifting element C, the third gear step by closing the first shifting element A and the second shifting element B, the fourth gear step by closing the first shifting element A and the sixth shifting element F, the fifth gear step by closing the first shifting element A and the fifth shifting element E, the sixth gear step by closing the fifth shifting element E and the sixth shifting element F, the seventh gear step by closing the second shifting element B and the fifth shifting element E, the eighth gear step by closing the third shifting element C and the fifth shifting element E, and the reversing gear R by closing the second shifting element B and the fourth shifting element D.

Advantageously therefore, the second shifting element B is in the form of a claw clutch to be engaged and is associated with the third and seventh gear steps and with the reversing gear. Moreover, the sixth shifting element F is also in the form of a claw clutch to be engaged and is associated with the fourth and sixth gear steps. In the gear arrangement according to this fourth embodiment variant two of the six shifting elements used can optionally or even at the same time be made as interlocking shifting elements B and F, so that the supporting shifts take place in the correspondingly associated gear steps. In this case the supporting shift for shifting to the third and fourth gear steps preferably takes place by way of the fifth gear step with the help of the associated fifth shifting element E, whereas the supporting shift to the sixth and seventh gear steps can preferably take place by way of the eighth gear step with the help of the associated third shifting element C.

Figure 9:
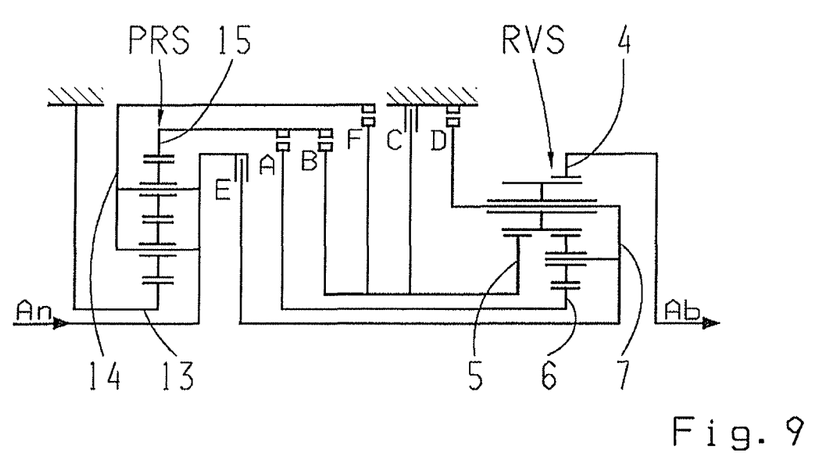
FIG. 9: A schematic view of a fifth embodiment variant of a power-shiftable, eight-gear planetary transmission for a motor vehicle.

FIG. 9 shows a fifth embodiment variant of the invention, this gear arrangement being designed as an eight-gear planetary transmission with a plus planetary gearset PRS and a Ravigneaux gearset RVS and with six shifting elements A, B, C, D, E and F. The difference from the fourth embodiment variant is that in the gear arrangement of the fifth embodiment variant, besides the second shifting element B and the sixth shifting element F both in the form of claw clutches, in addition the first shifting element A, which is now a claw clutch, and the fourth shifting element D, which is now a claw brake, have been changed to interlocking shifting elements. The first shifting element A, to be disengaged, is associated with the first to the fifth gear steps, while the fourth shifting element D, to be disengaged, is associated with the reversing gear R and the first gear step.

Figure 9A:
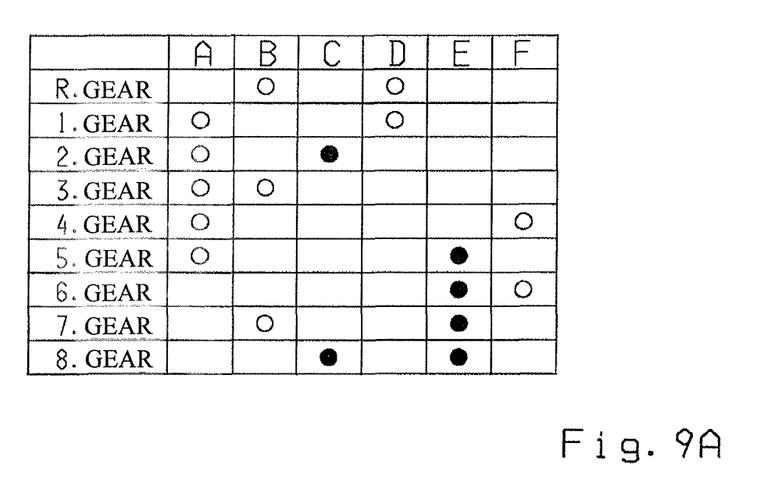
FIG. 9A: A possible shifting scheme for the planetary gear arrangement shown in FIG. 9.

The shifting scheme for the fifth embodiment variant, shown in FIG. 9A, corresponds to the shifting scheme for the fourth embodiment variant shown in FIG. 8A, the only difference being that now only the third shifting element C and the fifth shifting element E are still frictional power-shifting shift elements.

Figure 10:
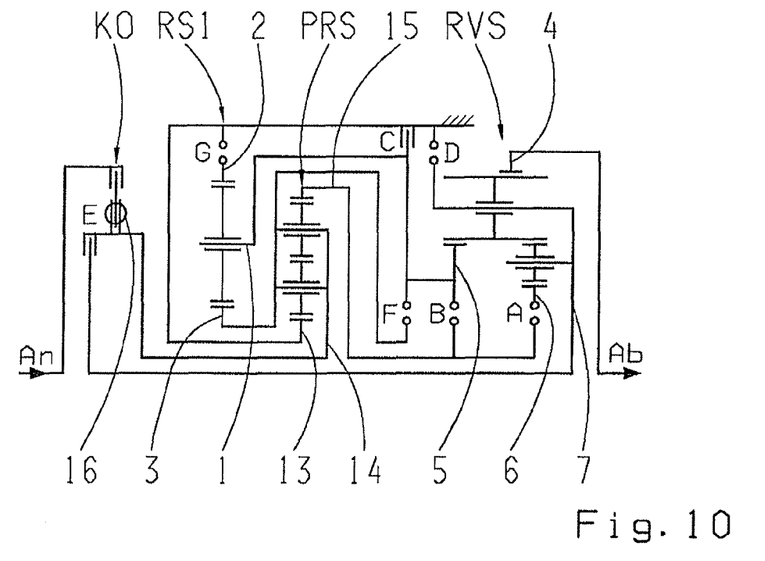
FIG. 10: A schematic view of a sixth embodiment variant of a power-shiftable, ten-gear planetary transmission for a motor vehicle.

FIG. 10 shows a sixth embodiment variant, which is a 10-gear planetary transmission with a first planetary gearset RS1, a plus planetary gearset PRS and a Ravigneaux gearset RVS and with seven shifting elements A, B, C, D, E, F and G, wherein of the seven shifting elements A, B, C, D, E, F, G only two are still frictional power-shifting shift elements, namely C and E, while the others are all interlocking shifting elements A, B, D, F, G.

To be specific, the first shifting element A, as a claw clutch to be disengaged, is associated with the first to the sixth gear steps, the second shifting element B, as a claw clutch to be engaged, is associated with the second, fourth and eighth gear steps and with a reversing gear step R2, the fourth shifting element D, as a claw brake to be disengaged, is associated with the reversing gears R1 to R3 and with the first gear step, the sixth shifting element F, as a claw clutch to be engaged, is associated with the fifth and seventh gear steps and with the reversing gear R3, and the seventh shifting element G, as a claw brake to be engaged, is associated with the third and ninth gear steps and with the reversing gear R1, whereas the third shifting element C, as a friction brake, is associated with the second and tenth gear steps and the fifth shifting element E, as a friction clutch, is associated with the sixth to the tenth gear steps.

In the gear arrangement according to FIG. 10 the drive input shaft An is connected by way of a starting clutch K0 and an oscillation damper 16. A planetary carrier 1 of the first planetary gearset RS1 is connected to the third shifting element C which is a friction brake, to the second shifting element B which is a claw clutch, to the sixth shifting element F which is a claw clutch, and to the first sun gear 5 of the Ravigneaux gearset RVS. Furthermore, a ring gear 2 of the first planetary gearset RS1 is connected to the seventh shifting element G which is a claw brake, while a sun gear 3 of the first planetary gearset RS1 is connected to the planetary carrier 14 of the plus planetary gearset PRS and to the sixth shifting element F which is a claw clutch. A sun gear 13 of the plus planetary PRS is connected to the third shifting element C which is a friction brake, to the fourth shifting element D which is a claw brake, and to the seventh shifting element G which is a claw brake, whereas a planetary carrier 14 of the plus planetary gearset PRS is connected on the one hand by way of the oscillation damper 16 and the starting clutch K0 to the drive input shaft An and to the fifth shifting element E which is a friction clutch, and on the other hand to the sun gear 3 of the first planetary gearset RS1 and to the sixth shifting element F which is a claw clutch. Moreover, a ring gear 15 of the plus planetary gearset PRS is connected to the second shifting element B which is a claw clutch and to the first shifting element A which is a claw clutch, whereas a ring gear 4 of the Ravigneaux gearset RVS is connected to the drive output shaft Ab. In addition, a first sun gear 5 of the Ravigneaux gearset RVS is connected to the planetary carrier 1 of the first planetary gearset RS1, to the second shifting element B which is a claw clutch, to the third shifting element C which is a friction brake, and to the sixth shifting element F which is a claw clutch, whereas a second sun gear 6 of the Ravigneaux gearset RVS is connected to the first shifting element A which is a claw clutch. Finally, a planetary carrier 7 of the Ravigneaux gearset RVS is connected on the one hand to the fourth shifting element D which is a claw brake, and on the other hand to the fifth shifting element E which is a friction clutch.

Figure 10A:
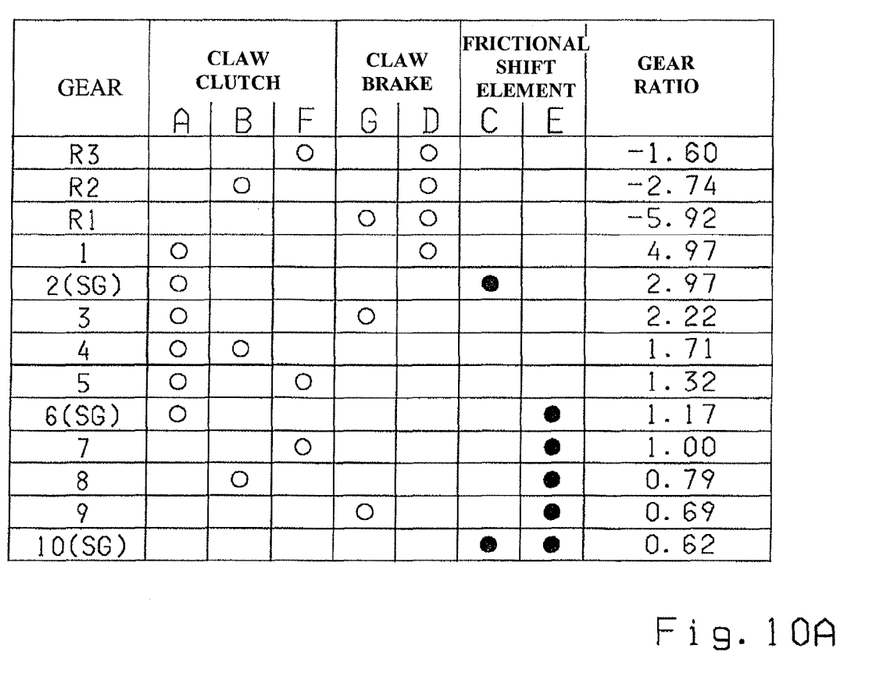
FIG. 10A: A possible shifting scheme for the planetary gear arrangement shown in FIG. 10.

The shifting scheme of FIG. 10A shows that in the gear arrangement of this sixth embodiment variant, the first gear step can be engaged by closing the first shifting element A which is a claw clutch and the fourth shifting element D which is a claw brake, the second gear step by closing the first shifting element A which is a claw clutch and the third shifting element C which is a friction brake, the third gear step by closing the first shifting element A and the seventh shifting element G which is a claw brake, the fourth gear step by closing the first shifting element A and the second shifting element B which is a claw clutch, the fifth gear step by closing the first shifting element A and the sixth shifting element F which is a claw clutch, the sixth gear step by closing the first shifting element A and the fifth shifting element E which is a friction clutch, the seventh gear step by closing the sixth shifting element F and the fifth shifting element E, the eighth gear step by closing the second shifting element B and the fifth shifting element E, the ninth gear step by closing the seventh shifting element G and the fifth shifting element E, the tenth gear step by closing the third shifting element C and the fifth shifting element, a reversing gear step R3 by closing the sixth shifting element F and the fourth shifting element D, a further reversing gear R2 by closing the second shifting element B and the fourth shifting element D, and an adjacent reversing gear R1 by closing the seventh shifting element G and the fourth shifting element D. In addition, for each gear step the gear ratio is indicated.

From this it can be seen, for example, that the third shifting element C associated with the second gear step, the fifth shifting element E associated with the sixth gear step, and the third shifting element C associated with the tenth gear step are in each case supporting elements so that the respective associated gear can be used as a supporting gear SG, in order to carry out shifts in which, as the shifting element to be engaged, an interlocking shifting element is involved, as already described.

In the shifting schemes described above and shown in FIGS. 1A, 2, 3, 6A, 7A, 8A, 9A and 10A, the filled circles represent frictional power-shifting element whereas empty circles represent interlocking shifting elements.

Indexes

1 Planetary carrier of the first planetary gearset
2 Ring gear of the first planetary gearset
3 Sun gear of the first planetary gearset
4 Ring gear of the Ravigneaux gearset
5 First sun gear of the Ravigneaux gearset
6 Second sun gear of the Ravigneaux gearset
7 Planetary carrier of the Ravigneaux gearset
8 Ring gear of the second planetary gearset
9 Planetary carrier of the second planetary gearset
10 Ring gear of the third planetary gearset
11 Sun gear of the second planetary gearset
12 Sun gear of the third planetary gearset
13 Sun gear of the plus planetary gearset
14 Planetary carrier of the plurality planetary gearset
15 Ring gear of the plurality planetary gearset
16 Oscillation damper
17 Planetary carrier of the third planetary gearset
K0 Starting clutch
An Drive input shaft
Ab Drive output shaft
A First shifting element
B Second shifting element
C Third shifting element
D Fourth shifting element
E Fifth shifting element
F Sixth shifting element
G Seventh shifting element
$T_{mot}$ Drive torque
$T_{ab}$ Drive torque
$T_B$ Torque applied at the second shifting element
$T_C$ Torque applied at the third shifting element
$T_E$ Torque applied at the fifth shifting element
t Time $n_{mot}$ Absolute rotational speed at the drive input
$n_{ab}$ Absolute rotational speed at the drive output
$dn_B$ Rotational speed difference at the second shifting element
$dn_C$ Rotational speed difference at the third shifting element
$dn_E$ Rotational speed difference at the fifth shifting element

The invention claimed is:

1. A power-shiftable transmission of a planetary design for a vehicle, the power-shiftable transmission comprising:
a plurality of frictional shifting elements, at least one interlocking shifting element (A, B, C, D, E. F, G) and a plurality of gearwheels which, via the frictional and the at least one interlocking shifting elements (A, B, C, D, E, F, G), are engagable in a power flow to implement a plurality of gear steps,
the plurality of gear steps including at least eight forward gear steps,
at least two associated shifting elements, of the plurality of frictional and the at least one interlocking shifting elements (A, B, C, D, E, F, G), are engaged for each of the at least eight forward gear steps,
at least one frictional shifting element, of the plurality of frictional shifting elements, is engaged for less than three gear steps of the plurality of gear steps, and
at least one interlocking shifting element (A, B, C, D, E, F, G) being associated, as a shifting element (B, C, F, G) to be engaged, with a target gear step to be engaged, by way of a supporting gear step during an upshift from a current gear step,
wherein, during the upshift to the target gear step to be engaged, the supporting gear step is temporarily engaged so as to facilitate synchronization and engagement of the at least one interlocking shifting element of the target gear step to be engaged.

2. The power-shiftable transmission according to claim 1, wherein for the upshift to the target gear step,
a gear step with a lower gear ratio than the target gear step is provided as the supporting gear step for eliminating a rotational speed difference during the upshift to the target gear step.

3. The power-shiftable transmission according to claim 1, wherein at least one interlocking shifting element (A, D) is associated with the current gear step as a shifting element to be disengaged.

4. The power-shiftable transmission according to claim 1, further comprising:
at least one plus planetary gearset (PRS) and at least one Ravigneaux gearset (RV),
at least first, second, third, fourth, fifth and sixth shifting elements (A, B, C. D, E, F), and
the second shifting element (B), associated with third and seventh gear steps and with a reversing gear step, and the sixth shifting element (F), associated with fourth and sixth gear steps, are designed as first and second claw clutches.

5. The power-shiftable transmission according to claim 4, further comprising:
a sun gear (13) of the at least one plus planetary gearset (PRS) is fixed to a housing,
a planetary carrier (14) of the at least one plus planetary gearset (PRS) is connected to each of the sixth shifting element (F), which is a second claw dutch, to a drive input shaft (An) and to the fifth shifting element (E), which is a first friction dutch,
a ring gear (15) of the at least one plus planetary gearset (PRS) is connected to the first shifting element (A), which is a second friction clutch, and to the second shifting element (B), which is a first claw clutch, a ring gear (4) of the Ravigneaux gearset (RVS) is connected to a drive output shaft (An), a first sun gear (5) of the Ravigneaux gearset (RVS) is connected to each of the second shifting element (B), which is the first claw clutch, to the third shifting element (C), which is a first friction brake, and to the sixth shifting element (F), which is the second claw clutch, a second sun gear (6) of the Ravigneaux gearset (RVS) is connected to the first shifting element (A), which is the second friction clutch, and a planetary carrier (7) of the Ravigneaux gearset (RVS) is connected to the fifth shifting element (E), which is the first friction clutch, and to the fourth shifting element (D), which is a second friction brake.

6. The power-shiftable transmission according to claim 1, further comprising:

at least one first planetary gearset (RS1), at least one plus planetary gearset (PRS) and at least one Ravigneaux gearset (RVS), at least first, second, third, fourth, fifth, sixth and seventh shifting elements (A, B, C, D, E, F, G) of the plurality of frictional shifting elements and at least one interlocking shifting element (A, B, C, D, E, F, G), the first shifting element (A), associated with first, second, third, fourth, fifth and sixth gear steps, is a first claw clutch, the second shifting element (B), associated with the fourth and an eighth gear step and a reversing gear step, is a second claw clutch, the fourth shifting element (D), associated with the reversing gear step and the first gear step, is a first claw brake, the sixth shifting element (F), associated with the fifth and the seventh gear steps and the reversing gear step, is a third claw clutch, and the seventh shifting element (G), associated with the third and a ninth gear step and the reversing gear step, is a second claw brake such that at most two shifting elements (C, E) are frictional power-shifting elements.

7. The power-shiftable transmission according to claim 6, further comprising:

a planetary carrier (1) of the first planetary gearset (RS1) is connected to each of the third shifting element (C), which is a friction brake, to the second shifting element (B), which is the second claw clutch, to the sixth shifting element (F), the third claw clutch, and to a first sun gear (5) of the Ravigneaux gearset (RVS), a ring gear (2) of the first planetary gearset (RS1) is connected to the seventh shifting element (G), which is the second claw brake, a sun gear (3) of the first planetary gearset (RS1) is connected to both a planetary carrier (14) of the plus planetary gearset (PRS) and to the sixth shifting element (F), which is the third claw clutch, a sun gear (13) of the plus planetary gearset (PRS) is connected to each of the third shifting element (C), which is the friction brake, to the fourth shifting element (D), which is the first claw brake, and to the seventh shifting element (G), the second claw brake, a planetary carrier (14) of the plus planetary gearset (PRS) is connected to each of a drive input shaft (An), to the fifth shifting element (E), which is the friction clutch, to the sun gear (3) of the first planetary gearset (RS1) and to the sixth shifting element (F), the third claw clutch, a ring gear (15) of the plus planetary gearset (PRS) is connected to both the second shifting element (B), which is the second claw clutch, and to the first shifting element (A), which is the first claw clutch, a ring gear (4) of the Ravigneaux gearset (RVS) is connected to a drive output shaft (Ab), a first sun gear (5) of the Ravigneaux gearset (RVS) is connected to each of the planetary carrier (1) of the first planetary gearset (RS1), to the third shifting element (C), which is the friction brake, and to the sixth shifting element (F), which is the third claw clutch, a second sun gear (6) of the Ravigneaux gearset (RVS) is connected to the first shifting element (A), which is the first claw clutch, and a planetary carrier (7) of the Ravigneaux gearset (RVS) is connected to both the fourth shifting element (D), which is the first claw brake, and to the fifth shifting element (E), which is the friction clutch.

8. A power-shiftable, automatic, planetary transmission for a vehicle, the transmission comprising:

a plurality of shifting elements comprising a plurality of frictional shifting elements and at least one interlocking shifting element;

a plurality of gearwheels being engagable in a power flow to implement a plurality of gear steps, the plurality of gear steps including at least eight fortward gear steps, each of the plurality of gear steps being implemented by selective engagement of only two of the plurality of frictional shifting elements and at least one interlocking shifting element that are associated with the respective gear step, at least one frictional shifting element, of the plurality of shifting elements, is engaged for less than three gear steps of the plurality of gear steps, when a desired gear step is to be implemented by engagement of the at least one interlocking shifting element, the at least one interlocking shifting element is engaged via partial engagement of a supporting gear step; and when shifting from a currently engaged gear to the desired target gear step in which the at least one interlocking shift element (A, B, C, D, E, F, G) is to be engaged, the supporting gear step is partially engaged so that a frictional shifting element, of the supporting gear step, is engaged with slip until synchronization of the at least one interlocking shifting element (A, B, C, D, E, F, G) to be engaged occurs and, thereafter, the supporting gear step is disengaged and the desired target gear step is completely engaged.

9. A power-shiftable transmission of planetary design for a vehicle, comprising:

a plurality of frictional shifting elements and at least one interlocking shifting element (A, B, C, D, E, F, G), and a plurality of gearwheels which, via the frictional and the at least one interlocking shifting elements (A, B, C, D, E, F, G), are engagable in a power flow to implement a plurality of gear steps;

eight of the plurality of gear steps being forward gear steps, and for each of the plurality of gear steps, only two associated shifting elements of the plurality of frictional and the at least one interlocking shifting elements (A, B, C, D, E, F, G) are engaged;

least one frictional shifting element, of the plurality of frictional shifting elements, is engaged for less than three gear steps of the plurality of gear steps;

at least one interlocking shifting element (A, B, C, D, E, F, G) being associated with a target gear step to be engaged;

a supporting gear step being temporarily engaged during an upshift from a current gear step to the target gear step to be engaged;

the supporting gear step sharing one common shifting element with both the current gear step and the target gear step to be engaged, and the supporting gear step is at most three gear steps higher than the target gear step to be engaged.

10. The power-shiftable transmission according to claim 9, wherein:

the supporting gear step is only one gear step away from the target gear to be engaged; and a first gear step immediately below the target gear step does not include the at least one interlocking shifting element (A, B, C, D, E, F, G) and a second gear step immediately above the target gear step does not include the at least one interlocking shifting element (A, B, C, D, E, F, G).

* * * * *